MAGNETIC LATCH

Filed March 11, 1966 7 Sheets-Sheet 1

INVENTORS
MARRON KENDRICK
RALPH E. NEARY
BY
Lothrop & West
ATTORNEYS

MAGNETIC LATCH

Filed March 11, 1966 7 Sheets-Sheet 2

INVENTORS
MARRON KENDRICK
RALPH E. NEARY
BY
Lothrop & West
ATTORNEYS

MAGNETIC LATCH

Filed March 11, 1966 7 Sheets-Sheet 3

INVENTORS
MARRON KENDRICK
RALPH E. NEARY
BY Lothrop & West
ATTORNEYS

Nov. 26, 1968 M. KENDRICK ETAL 3,413,026

MAGNETIC LATCH

Filed March 11, 1966 7 Sheets-Sheet 4

INVENTORS
MARRON KENDRICK
RALPH E. NEARY

BY

Lothrop & West

ATTORNEYS

MAGNETIC LATCH

Filed March 11, 1966

INVENTORS
MARRON KENDRICK
RALPH E. NEARY
BY Lothrop & West
ATTORNEYS

MAGNETIC LATCH

Filed March 11, 1966 7 Sheets-Sheet 6

INVENTORS
MARRON KENDRICK
RALPH E. NEARY
BY
Lothrop & West
ATTORNEYS

INVENTORS
MARRON KENDRICK
RALPH E. NEARY
BY
Lothrop & West
ATTORNEYS

United States Patent Office
3,413,026
Patented Nov. 26, 1968

3,413,026
MAGNETIC LATCH

Marron Kendrick, Atherton, and Ralph E. Neary, San Francisco, Calif., assignors to Schlage Lock Company, a corporation Filed Mar. 11, 1966, Ser. No. 533,688
13 Claims. (Cl. 292—144)

ABSTRACT OF THE DISCLOSURE

A magnetic latch has a magnet unit on a door frame and a latch unit on a swinging door mounted on the frame. The latch unit has both pivoted and sliding members interconnected and movable into and out of the magnet unit, at least one of the pivoted and sliding members being magnetically responsive to the asymmetrical or distorted magnetic field of a magnet in the magnet unit.

Our invention relates to means for temporarily securing together relatively movable members, for example a door panel and its adjacent door frame.

In most latch mechanisms there is provided a latch bolt which normally is spring pressed to project from its mounting, for example in a hinged door. The latch bolt is depressed as the door swings into closed position and then is again spring projected. The latch bolt can be retracted against the spring by an unlocked knob. This leaves the latch bolt projecting when the door is standing partly or entirely open and may interfere with the passage of people or goods past the door.

In many instances the spring mechanism is relatively stiff so that the motion of the latch bolt requires considerable force. The latch bolt ends its travel accompanied by a substantial noise or click, often considered undesirable. A relatively severe or stiff spring requires much of the rest of the mechanism to be relatively stiff and heavy for structural reasons. The latch bolt is depressed upon door closure by a camming action against a strike plate. A projection on the strike plate intercepts and cams the latch bolt toward depressed position, but this projection also may act as a snag for clothing.

The latch of the present invention includes sliding and swinging bolt members interconnected by a pin and slot. One of the members is made of magnetically permeable material, and both of the members are normally recessed in a bolt housing. A keeper is formed with a strike plate behind which is positioned a body of magnetic material sandwiched by pole pieces formed to distort the magnetic field in the direction of relative movement of the latch and keeper. Both bolt members are caused to enter an opening in the strike plate when the door and jamb, on which the latch and keeper are mounted, are in closed position; and catch means in the latch mechanism secures the bolt members in latching position.

It is therefore an object of our invention in general to provide an improved latch mechanism and one which has easily movable parts and parts of relatively light weight.

It is another object of the invention to provide a latch which does not normally project from the latch mounting when the door is in open position.

Another object of the invention is to provide a secure but simple latch arrangement so that the operation is relatively quick and quiet.

A further object of the invention is to employ a magnetic means for assisting in the functioning of a latch mechanism.

A still further object of the invention is to provide a magnetic latch which can replace or substitute for spring pressed latch mechanisms and will produce the latching functions of the spring pressed latch and additional functions as well.

Another object of the invention is in general to provide a substantially improved magnetic latch.

Other objects together with the foregoing are attained in the magnetic latch described in the accompanying description and illustrated in the accompanying drawings, in which.

Figure 1:
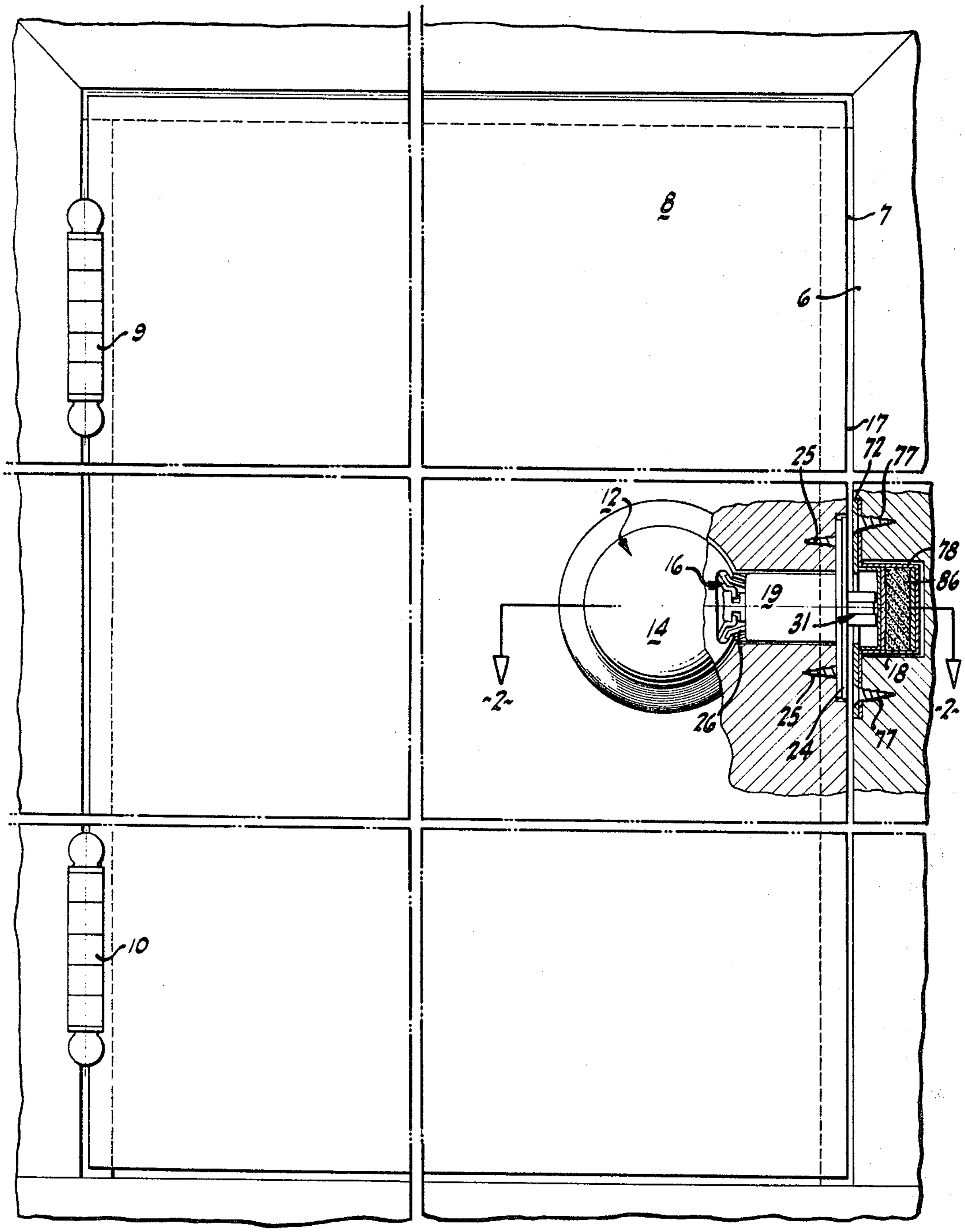
FIGURE 1 is an elevation of a door frame and a door panel hinged thereon and in which a magnetic latch pursuant to the invention has been incorporated, certain portions of the figure being broken away to reduce its extent and other portions being broken away to disclose the interior appearance of the latch.

The magnetic latch pursuant to the invention can be incorporated in a number of different ways, but has successfully been fabricated as disclosed herein particularly for installation in the customary environment. This usually involves a door frame 6 surrounding a generally rectangular door opening 7 in which a door panel 8 is mounted on hinges 9 and 10 also secured to the door frame. The door panel 8 is effective to swing about the vertical axis of the hinges 9 and 10. In the usual way there is mounted on the door panel 8 and in fact within a portion of the panel a manually operated magnetic latch mechanism 12. This includes knobs 13 and 14 on opposite sides of the door panel and effective through a standard actuating mechanism 16 to afford a reciprocatory motion inwardly and outwardly with respect to the vertical edge 17 of the door panel 8. Associated with the rest of the latch mechanism is a strike unit 18 installed in the door frame 6 in a fashion to cooperate with the latch unit 19 of the mechanism.

Since much of the installation is substantially standard, it is not disclosed in greater detail, it being understood that rotation manually of either of the knobs 13 and 14 is effective to produce the described reciprocation of the mechanism 16 within the door panel.

Situated at an appropriate location in the door panel and extending inwardly from the edge 17 thereof, the latch unit 19 includes a tubular casing 21 having an end flange 22 secured between a backing plate 23 and a latch plate 24 fastened to the door panel by screws 25 or other comparable means. The casing 21 is provided with interconnections 26 securing the casing to the actuating mechanism 16 in the usual way.

Mounted in the latch unit is a compound latch structure generally designated 31. This includes a pivot pin 32 disposed between and bearing in the adjacent portions of the latch plate 24, the flange 22 and the backing plate 23. The pivot pin 32 (FIGURE 7) is captured within slots 33 and 34 cut out of the flange 22 and within displaced portions 36 and 37 in the latch plate 24 above and below an opening 38 piercing the plate. When the parts are assembled, the pin 32 is restrained from displacement including endwise motion and preferably also against rotation. Mounted on the pin 32 and included in the compound latch member are a pair of spaced-apart, pivoted latch members 41 and 42 substantially the same in shape and related for common rotation by an operating pin 43 passing into and seated within both of the pivoted latch members. A spacer 44 on the pivot pin assures that the distance between the pivoted latch members 41 and 42 is appropriately maintained. The dimensions of the pivoted latch members are such that they swing freely through the opening 38 and occupy respective positions adjacent the upper margin and the lower margin of that opening.

Also included in the compound latch structure is a sliding latch member 46. This is plate like and has generally parallel, rectilinear side edges 47 and 48 and has a transverse forward edge 49 merging with an inclined forward edge 51. An opening 52 is formed through the sliding latch member 46 and extends transversely so as to encompass the operating pin 43. The member 46 is so shaped that the side edge 48 tends to be guided by the spacer 44 on one side and the side edge 47 tends to be confined in and guided by an extension 53 of the opening 38. In this fashion the sliding latch member is in effect sandwiched between the pivoted latch members 41 and 42. Because of the connection by the operating pin 43, the sliding latch member projects and retracts in a rectilinear path as the pivoted latch members project and retract in a circular path.

The sliding latch member also has a projection 54 in its forward position abutting the spacer 44 and serving as a stop for forward motion.

Rectilinear motion of the sliding latch member is provided through a lost motion connection. The sliding latch member is formed to provide a J-shape or hook extension 56 defining a lonigtudinally extending central passageway 57 having a lateral opening 58. To cooperate with the horizontal sliding latch member 46 and partially to occupy the passageway 57 is a retractor 59 extending generally vertically and its forward end having an upright bar 60 which can be passed through the opening 58 to occupy the passageway 57 with lonigtudinal lost motion. The bar 60 is joined through connectors 61 and 62 to the usual terminus 63 interengaged with the standard actuating mechanism.

With this arrangement, when the knobs 13 or 14 are turned and the actuating mechanism is retracted, the terminus 63 is likewise drawn inwardly and the vertical bar 60 moves freely in the passageway 57 until it reaches the end of that passage and then by abutment with the end bar 64 of the J-shaped portion 56 moves the sliding latch member 46 inwardly and correspondingly rotates the pivoted latch members 41 and 42 inwardly. Because of the lost motion, the bar 60 can move to and fro within the passageway 57 for a substantial, longitudinal distance. This permits the projected latch members 41, 42 and 46 to move inwardly and outwardly without disturbing the retractor 59 when the retractor is in its forward position. So that the retractor 59 is yieldably held in its forward rest positon, there is provided a light coil spring 65 at one end resting against the end of the casing 21 and at the other end resting against a flanged disk 66. A stiffening rim 67 on the disk is slidably engaged with the casing interior and has a cruciform central opening 68 to accommodate the retractor 59 and the sliding latch member 46. Tabs 69 and 70 are struck up from the disk in order to lie against the side edges of the J-shaped portion 56 of the sliding latch member to serve as additional guides and supports.

As so far described, there is provided a latch unit in which three latch members, two pivoted and one sliding, are capable of projecting from or retracting into the latch unit housing. The retractor 59 is moved into a retracted position against the spring 65 and the three latch members are simultaneously retracted upon the movement of the knobs 13 and 14. The latch members themselves are devoid of any direct spring restraint.

Particularly pursuant to our invention and especially to cooperate with the latch unit, there is provided a magnetic mechanism 71 in the strike unit 18. Mounted in the frame 6 is a strike plate 72 of a suitable configuration having a strike opening 73 therein. The strike plate has pierced bosses 74 and 76 of different diameters therein for the reception of fastening screws 77 for holding the strike plate in position. The strike plate 72 does not have the customary lip or projection extending laterally in alignment with the opening 73. The strike plate 72 is assembled with a strike box 78 having different size apertures 79 and 81 to fit over the bosses 74 and 76 in order that only one relationship of these parts can be established. The strike box 78 includes a formed central strip having side tabs 82 thereon.

Designed to fit within the strike box is a magnet 86. This may be an electromagnet, but preferably is a permanent magnet. Conveniently, it is in the form of a generally regular block of any suitable magnetic material. In the present instance the block is of oriented barium ferrite magnetized so that it has one magnetic pole 87, for example, the south magnetic pole, on one face and the opposite magnetic pole, for example, the north magnetic pole, on the opposite face 88. The magnetic block is positioned in the strike box 78 but with an intervening L-shaped pole piece 89 of magnetic material. The pole piece has an opening 91 designed to interfit with a projection 92 on the back of the strike box so that the pole piece 89 can be assembled in only one way with respect to the strike box and in turn with respect to the strike plate 72. The effect of the L-shaped pole piece 89 is to extend one of the poles 87 of the magnet 86 from the rear face of the magnetic block to a forward position on one side thereof so that the leading portion 93 of the pole piece 89 in effect becomes a south pole, for example. The magnetic block is not quite as wide as the strike box, so an inert spacer 94 is located alongside the magnetic block to prevent flux short circuiting and hold the assembly immovable.

Also disposed next to the magnetic block is another L-shaped pole piece 96 of magnetic material having substantial contact with the north pole face 88 of the magnetic block and having a forwardly projecting lateral member 97 so that there is provided immediately behind the strike plate 72 a north pole at one side of the opening 73. A positioning and locating member 98 is provided against the pole piece 96 and has upper and lower extensions 99 and 101 designed to abut the rear face of the strike plate 72 and has lateral wings 102 and 103 so that the member 98 is centralized within the strike box.

Figures 6, 7, 8:
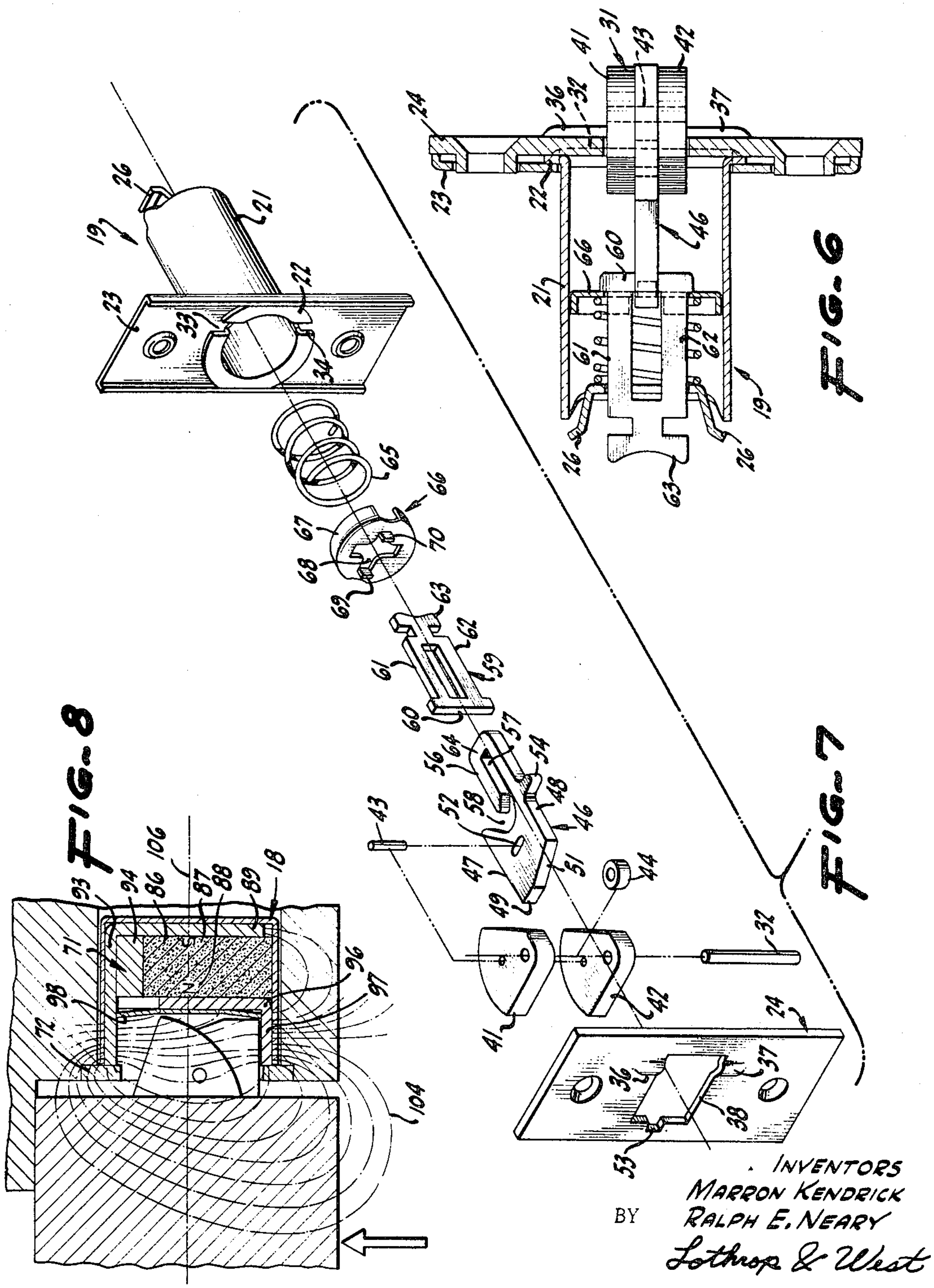
FIGURE 6 is a cross section, the plane of which is indicated by the line 6—6 of FIGURE 2.
FIGURE 7 is a view in isometric projection and with the parts "exploded" or in spaced relationship illustrating the latch unit of the magnetic latch mechanism.
FIGURE 8 is a cross section of the strike unit of the latch mechanism particularly illustrating the preferred form of magnetic flux field.

With this arrangement, when the parts are appropriately assembled the strike unit affords a magnetic field which is distorted or displaced or perturbed with respect to the normal, symmetrical magnetic field which can be expected from the simple magnetic block 86. Thus, as shown in FIGURE 8, the magnetic block itself is displaced toward one side and the pole pieces 89 and 96 are such that the magnetic flux pattern when considered in a central horizontal plane appears approximately as illustrated in that figure. The magnetic lines of force 104 are not symmetrical about the center line 106 of the installation. The flux field is distorted toward the direction of approach of the door panel 8 with respect to the door frame 6, so that the flux field extends outwardly toward the approaching door.

To take advantage of the distorted magnetic field, at least some portions of the latch unit are made of magnetically responsive material. For example, the pivoted latch members 41 and 42 are ferrous, but preferably the sliding latch member 46 is non-ferrous. It is not necessary to have several of these members magnetically responsive, but one or more of the three is of magnetically responsive material.

With this arrangement, the door panel 8 when in most open positions is completely away from the magnetic field 104. It can be assumed that the latch members 41, 42 or 46 are then retracted or withdrawn within the latch casing 21 since there is no spring force or other force tending to project them. The latch members do not project into the path of movement of goods or persons by them and a distinct advantage in providing a smooth contour is attained.

Figures 2, 3, 4, 5:
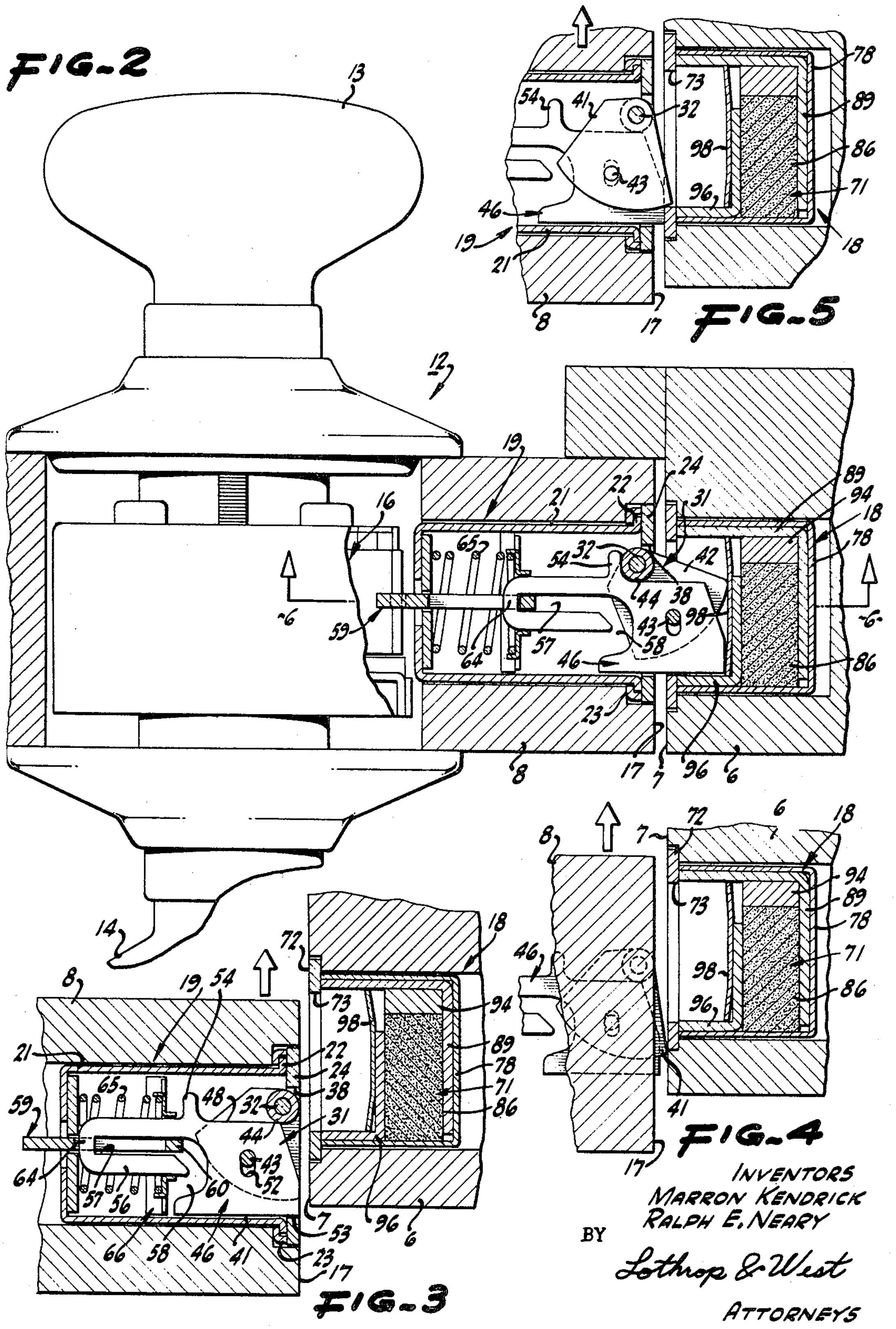
FIGURE 2 is a cross section on the line 2—2 of FIGURE 1 with the parts shown to an enlarged scale.
FIGURE 3 is a cross section, the plane of which is indicated by the line 2—2 of FIGURE 1, but with the parts shown in a different position than in FIGURE 2.
FIGURE 4 is a view comparable to FIGURES 2 and 3 but with the parts in a still different position.
FIGURE 5 is a view comparable to FIGURES 2, 3 and 4 but with the parts in a further different position.

As the door panel 8 is swung toward closed position, the latch members enter a gradually increasing magnetic force field and the responsive one or ones are drawn outwardly by the magnetic force from their retracted position behind the face plate 24. All of the latch members move out together and take up the lost motion between the end 64 of the J-shaped portion 56 and the vertical bar 60 of the retractor 59. The effect is to pull the latch members outwardly and over the edge of the strike plate into the strike box 78, as shown in FIGURE 8. The forces are such that as the latch members are pulled outwardly while the door approaches closed position, they may drag over the edge of the strike plate slightly as shown in FIGURE 4. The force of this rubbing action is slight and there is no appreciable noise or wear.

The movement and force of the latch members are not great until the latch members are well within the boundaries of the door frame. It is therefore not necessary to have any projecting lip or cam on the strike plate and thus another possible point of catching clothes of passersby is eliminated. In addition, even if the latch members are moved out somewhat early in the closing movement of the door; for example, due to the centrifugal force of a rapid door closure, the force required to depress them as they move over the door frame is relatively slight, so that the ordinary materials of the door frame can stand this force with substantially no wear. If desired, a light spring can be used against the movable latch members to offset all or part of such centrifugal force, but usually is not considered necessary and so is not illustrated.

Even in an extreme case, if the door is slammed so that centrifugal force acting upon the otherwise rather freely movable latch members 41, 42 and 46 impels them radially outwardly of the closing door, the mass of these members is so small that they are mechanically forced into the latch housing as the door moves in toward its closed position. In any case, the latch members are finally drawn out by the effect of the magnetic field. Since this field is distorted in the direction of approach of the door, the effect of the magnet occurs much earlier on the movable latch members than it would were the magnetic field symmetrical, so that the latch members are accelerated somewhat early in the closing movement and effectively move into position to hold the door closed whether the door is closed gently or is slammed.

When the door is in closed position, as shown in FIGURES 2 and 8, the movable latch members are fully projected. The pivoted latch members do not normally abut the adjacent side of the opening 73 in the strike plate, as this is unnecessary to hold the door panel in that closing direction since the door panel is against the door frame or door stop forming part of the door frame. If there were only pivoted latch members, there would be a substantial gap between the arcuate margins thereof and the other side of the strike plate opening 73. This would permit rattling. However, the sliding latch member 46 when more or less projected always has its rectilinear side 47 in engagement either with the side of the latch plate opening 73 or the adjacent pole piece 96 so that there is little or no transverse or lateral play. Thus when the door is closed or latched there is a firm interengagement of the door panel and the door frame.

When the door is to be opened, the knob 13 or 14 is turned, as usual, and this pulls the retractor 59 inwardly against the urgency of the spring 65. The lost motion having been taken up when the latch members projected, the sliding latch member 46 is immediately withdrawn and withdraws the rotary or pivoted latch members 41 and 42 also until they are all substantially flush with the face plate 24. The door can then be opened in the usual way. When the actuated knob is released, although the retractor 59 is immediately urged forwardly by the spring 65, the sliding latch member 46 is not disturbed at all and by normal friction and inertia remains in its withdrawn or retracted position as do the pivoted latch members 41 and 42, thus placing the lock in its quiescent condition.

Under some conditions, and as a modification, a light spring can be used always to urge the movable latch members outwardly and then the magnet in the strike unit can be omitted. Some, but not all, of the advantages can be attained in that way.

Sometimes a variant form of magnetic installation is desirable. As particularly shown in FIGURE 10, it is not necessary always to utilize a simple block magnet 86 and pole pieces 89 and 96. Rather, the strike box 111 is directly secured to the strike plate 112, as before, but houses a horseshoe magnet 113 having its poles 114 and 116 in the customary position on either side of the opening 117 in the strike plate 112. The horseshoe magnet 113 can be symmetrical and can provide a symmetrical field, although this is not particularly desirable, or the horseshoe magnet 113 can be positioned asymmetrically so that the field is distorted, substantially as shown in FIGURE 8. While this arrangement is practical for some uses, it has been found that the FIGURE 8 arrangement is superior for most installations.

Figures 9, 10, 11:
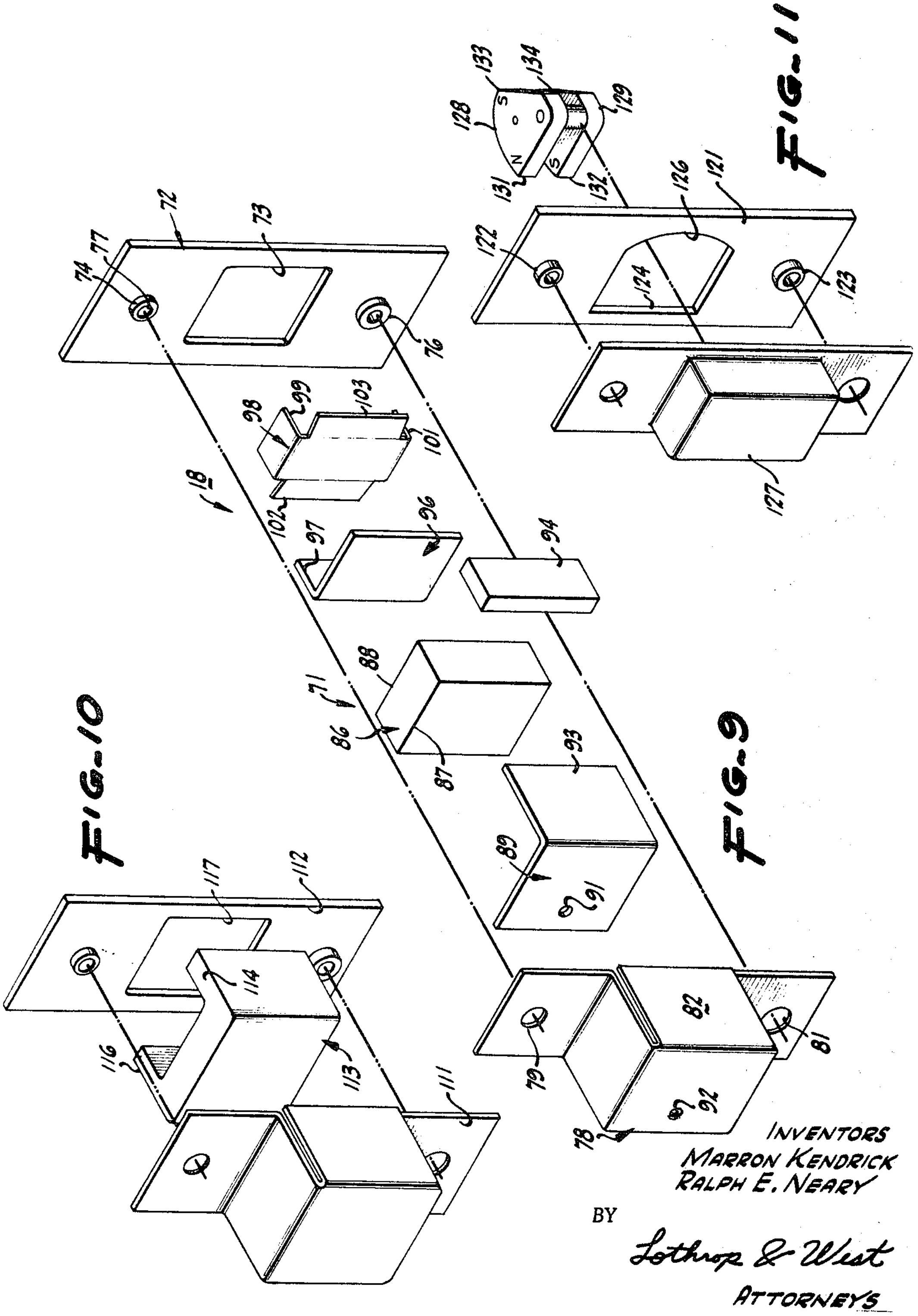
FIGURE 9 is a view in isometric projection showing parts of the strike unit in spaced-apart or "exploded" relationship.
FIGURE 10 is a view somewhat comparable to FIGURE 9 and showing a modified form of strike unit for use in the magnetic latch.
FIGURE 11 is a view showing a further modified form of strike unit with an associated latch diagrammatically illustrated.

As a further variation, as shown in FIGURE 11, a strike plate 121 having non-interchangeable bosses 122 and 123 and a strike opening 124 which is not laterally symmetrical but has a curved edge 126 on one side may be used. This strike plate is helpful in guiding a workman in properly installing the strike unit so that the field is distorted in the direction of approach of the closing door.

Another variation shown in FIGURE 11 is a strike box 127 formed with a relatively shallow configuration adequate to receive the movable latch members but not having any magnet therein. The strike box 127, however, is made of ferrous or other magnetically responsive material. In this instance, the pivoted latch members 128 and 129, although physically of the same appearance as those shown in FIGURE 7, for example, are different in that they themselves are electro or permanently magnetized. For example, they have north and south poles 131 and 132 in their advanced portions and corresponding opposite poles 133 and 134 in their interior portions. The operation of this structure is substantally the same as previously described since the magnetic field is distorted. Further, as another variation, there may be magnets within the strike unit of polarity opposite to the polarity of the magnetic members located in the latch unit.

The latch unit, as so far described, can sometimes be depressed by unauthorized means since the sliding latch member may with some difficulty be "carded"; that is, moved by a straight member pushed into the gap between the door frame and the door panel. It may be possible to insert a hook into ths gap below or above the latch members and then by withdrawing the hook against the pivoted latch members 41 and 42 force those latch members into the latch housing and thus open the door. Such unauthorized operation is prevented by an appropriate deadlatching mechanism.

Figure 12:
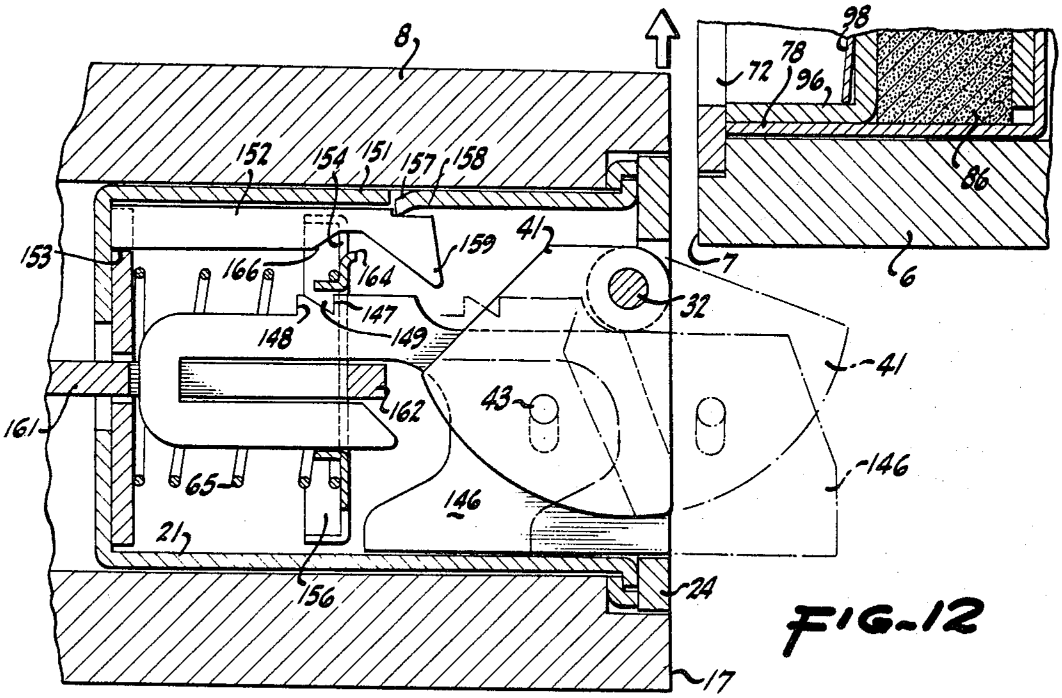
FIGURE 12 is a view similar to FIGURE 2 and showing in similar cross section but to an enlarged scale a form of magnetic latch in which the latch unit incorporates a deadlatching feature.
Figure 13:
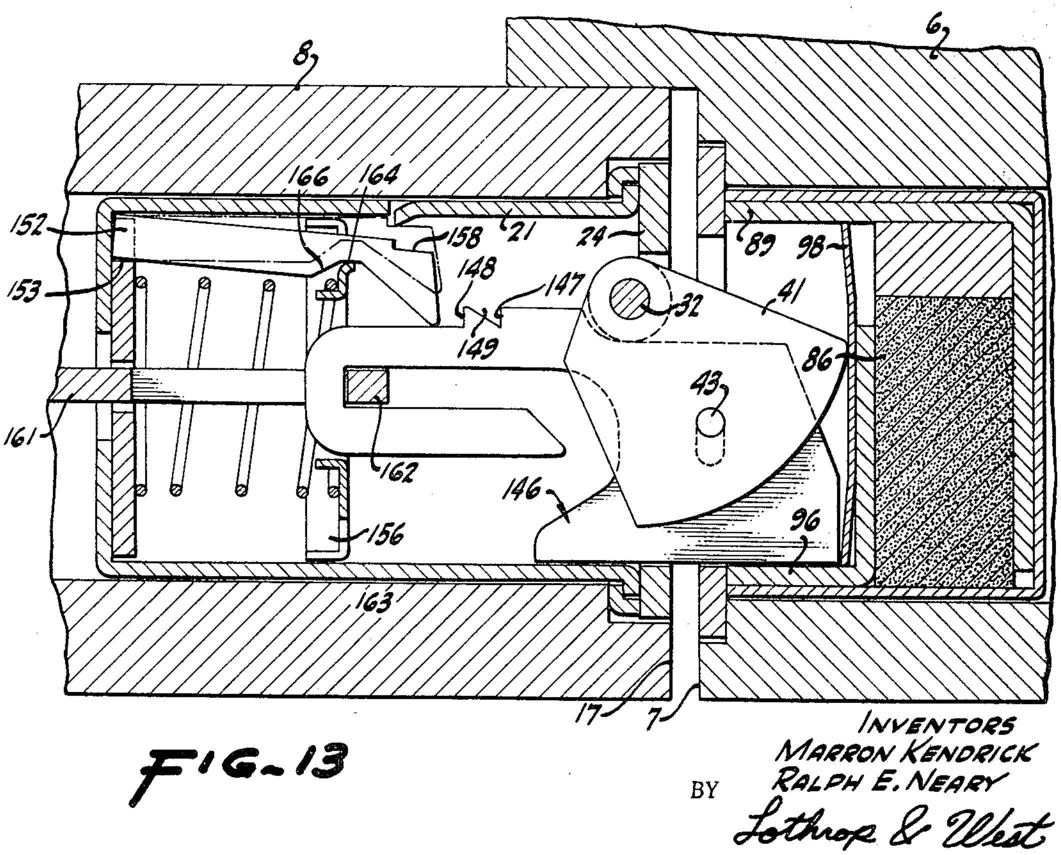
FIGURE 13 is a view similar to FIGURE 12 showing the parts in a different position of operation.

As especially shown in FIGURES 12 and 13, one form of deadlatching mechanism utilizes various parts previously described but slightly modified. For example, the sliding latch member 146 is approximately of the same configuration as before except that it is ferrous and is provided with a pair of laterally extending abutments 147 and 148 lying either side of a lateral notch 149. Disposed within the latch housing 151 is a ferrous deadlatch strut 152 loosely confined in a notch 153 and laterally movable in a side notch 154 in the disk member 156. The strut 152, being so mounted, is generally movable in an approximately pivotal or swinging fashion within the notch 154. The strut is restrained from outward movement especially due to centrifugal force by a detent 157 which fits within a notch 158 in the forward end of the strut.

In the operation of this mechanism, when the sliding latch member 146 is in its retracted position and is out of the magnetic field, the strut 152 remains in its withdrawn position as shown in FIGURE 12. When, however, the sliding latch member 146, together with the pivoted latch members, enters the magnetic field near door closed position, the field induces magnetism in the sliding latch member 146 in the vicinity of the strut end so that the strut end 159 is magnetically urged toward the abutments 147 and 148. Thus as the sliding latch member 146 is projected, the strut member rides over the abutments 147 and 148 and either drops into the notch 149 behind the abutment 147 or drops against the side edge of the sliding latch member behind the abutment 148 as shown in FIGURE 13. Then, when the latch members are nearly or fully projected, any exterior force tending to force them toward retracted position is ineffective since the strut is jammed against an appropriate abutment and extensive inward movement of the latches is prohibited and the lock unit is deadlatched.

When either of the knobs 13 and 14 is turned, the retractor 161 is moved inwardly as usual and the vertical member 162 thereon abuts and carries the disk member 156 inwardly therewith. Thereupon a lip 164 on the disk member 156 cams against an inclined cam surface 166 on the strut 152 and despite any induced magnetic attraction forces the strut laterally out of the path of retraction of the adjacent abutment 148 or the abutment 147. When the knob is released and the spring again advances the disk 156 to its position in FIGURES 12 and 13, the strut has already been restored to its out of the way location and the movable latch members are out of the magnetic field so that there is nothing further to attract the strut until the door again is near or in closed position.

Figure 14:
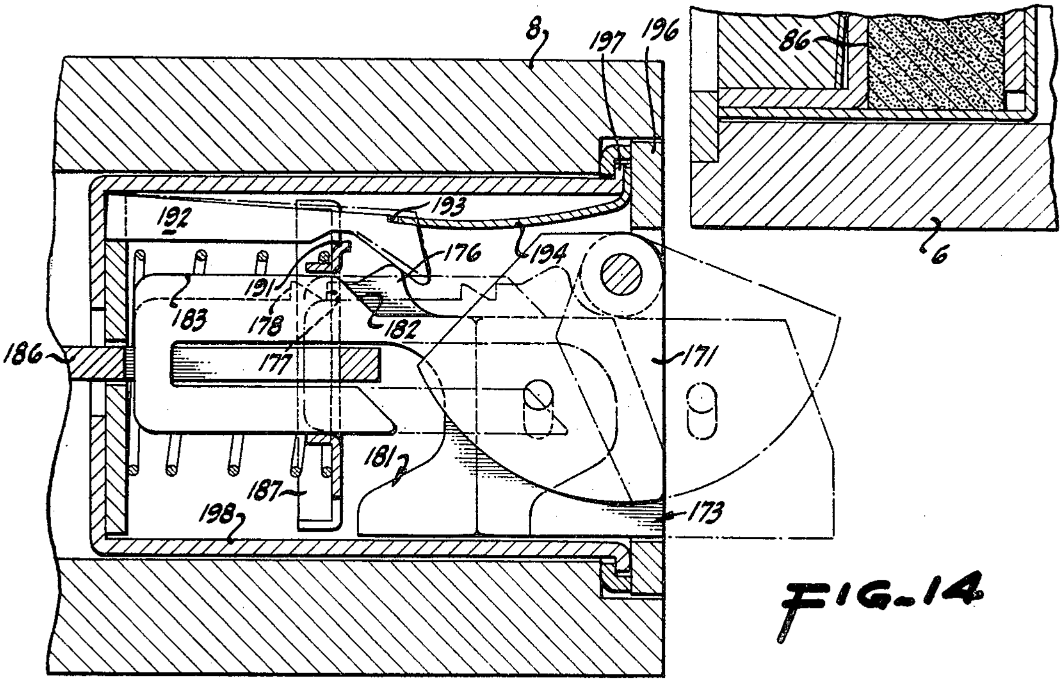
FIGURE 14 is a view comparable to FIGURE 12 but showing a modified form of deadlatching magnetic latch structure.
Figure 15:
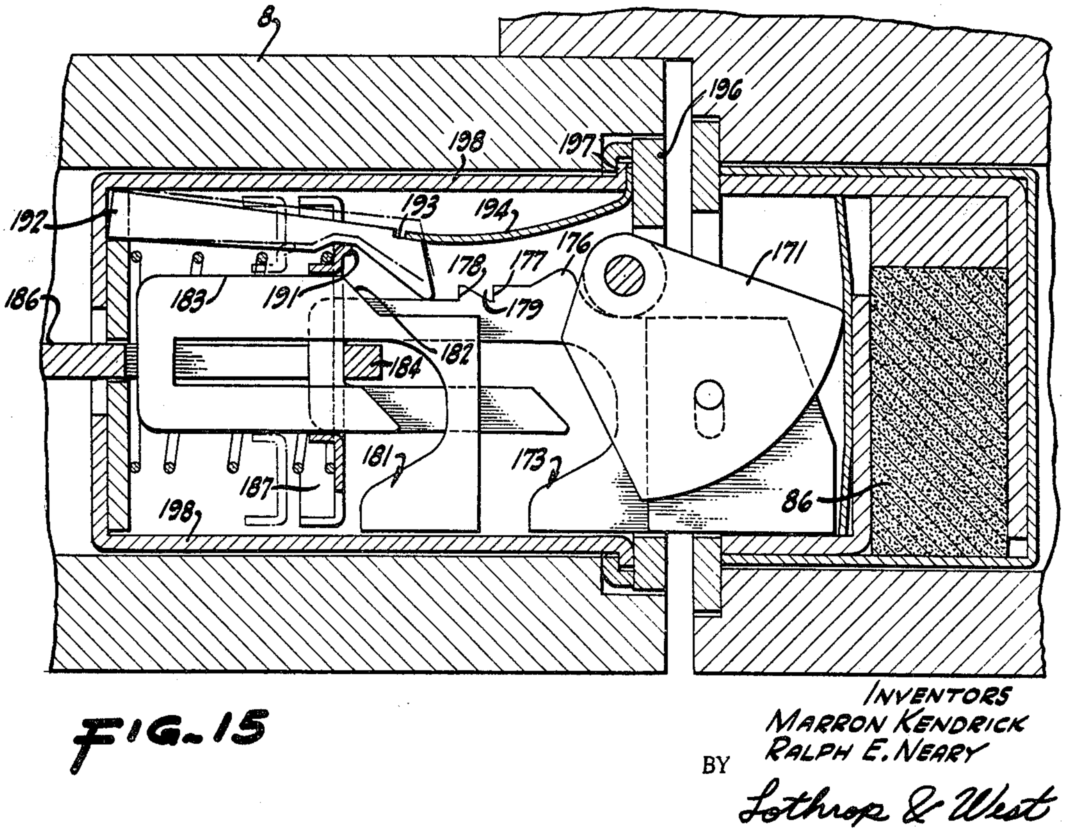
FIGURE 15 is a view comparable to FIGURE 14 but showing the parts in a different position of operation.
Figure 16:
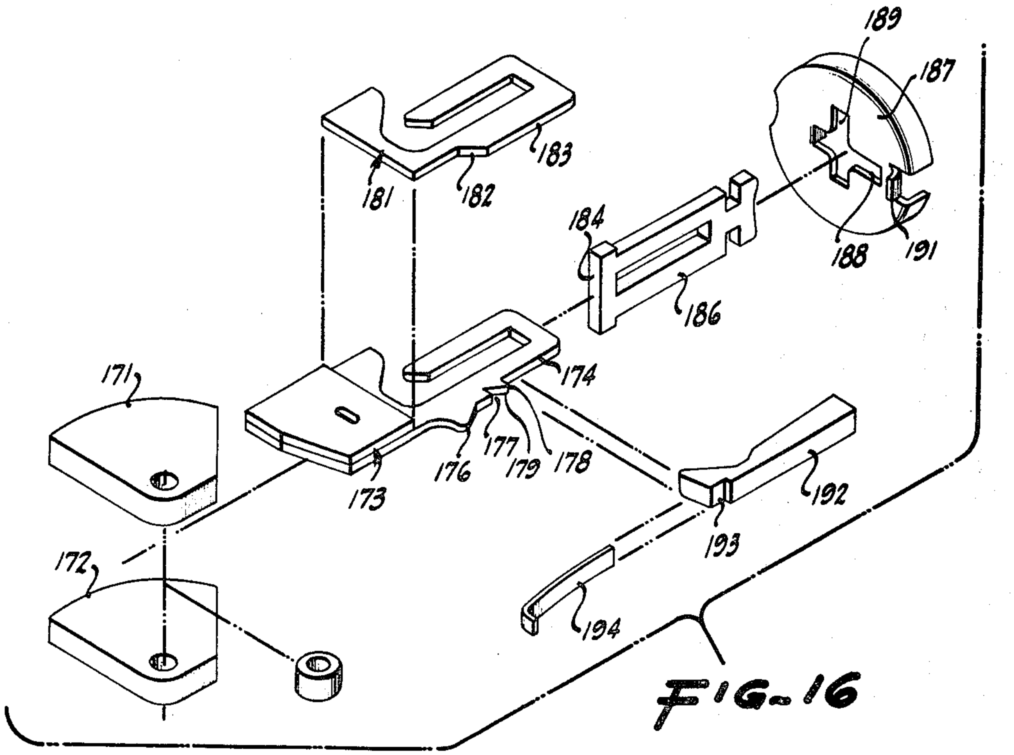
FIGURE 16 is an isometric projection of parts of the deadlatching latch unit shown in FIGURES 14 and 15, the parts being in "exploded" or spaced-apart locations.

In some installations it is desired not to utilize the induced magnetic effect to provide the deadlatching feature. An alternative mechanism is shown in FIGURES 14, 15 and 16. Particularly as shown in FIGURE 16, the pivoted latch members 171 and 172 are substantially the same as before, but the sliding latch member 173, although having its contour as shown in FIGURE 7 and being virtually the same in its forward portion, is reduced in thickness in its rearward portion 174. Along one edge, the sliding latch member has a cam projection 176 and abutments 177 and 178 either side of a notch 179.

Designed to fit over the thin portion 174 of the sliding latch member and bringing its thickness up to that of the forward portion is a sliding deadlatching plate 181 of non-magnetic material and having a configuration similar to that of the sliding latch member but particularly including a cam ramp 182 leading to a widened rearward portion 183. These approximately overlie the abutments 177 and 178 and extend approximately as far out as the cam abutment 176. The plate 181 is subject to control by a vertical bar 184 of a retractor 186, which is the same as previously described.

The retractor operates through a disk member 187 substantially as previously described except that it includes an elongated opening 188 as part of a cruciform aperture 189 centrally disposed therein. Additionally, the disk member carries a camming projection 191 similar to that utilized in connection with the mechanism of FIGURES 12 and 13. A strut 192 is confined substantially as before and is similarly contoured except that it has a forward notch 193 to receive one end of a leaf spring 194 confined between the face plate 196 and the flange 197 at the forward end of the latch bolt casing 198. The spring 194 urges the strut 192 toward the sliding latch mechanism.

When the latch members are retracted with the door panel open, the parts are positioned as shown in FIGURE 14 and the strut 192, although urged by the spring 194, is kept to one side by virtue of contact with the projection 176 on the sliding latch member 173. If the door panel should be slammed so that centrifugal force as the door swings closed tends to project the movable latch members, then the same centrifugal force moves the slide plate 181 forwardly against the thickened forward portion of the sliding latch member and the cam face 182 underlies the forward end of the strut and the wide side portion 183 rests alongside the forward portion of the strut. Despite the fact that the movable latch members may project before the door actually closes, still when the latch members cam against the edge of the door frame in moving toward door closed position and the latch members are forced inwardly, the deadlatch strut is held inactive. The movement of the latching members in riding over the edge of the door frame moves the slide plate 181 into its rearmost position away from the forward end of the strut. The slide plate 181, being non-ferrous, is not moved from its FIGURE 14, retracted position by magnetic attraction.

When the movable latch members are again projected as the door panel attains closed position and the latch members are under magnetic attraction, the strut member moves into a position behind the abutment 177 or the abutment 178 and the lock unit is deadlatched. Subsequently, when a knob is rotated to retract the latch members, the retractor 186 simultaneously moves the slide plate 181 and the sliding latch 173 rearwardly. At the same time the cam 191 on the disk 187 moves the latch member laterally against the force of the spring and out of the way of the retracting latch members. The parts are thus restored to their initial condition ready for subsequent operation.

Herein reference has been made to a pivoted door panel, but the door panel can slide and the described lock units can be installed thereon at the top or bottom sliding edges. The action is as previously described since the motion of the latch unit in approaching the strike unit is virtually rectilinear translation in either case.

What is claimed is:

1. A magnetic latch for use on a frame member and a door member having relative movement comprising a magnet unit on one of said members and including a body of magnetic material and pole pieces providing a field distorted in the direction of said relative movement; and a latch unit on the other of said members, said latch unit including a pivoted latch member, a sliding latch member, and means interconnecting said latch members for conjoint movement of both of said latch members into and out of said other member, at least one of said latch members being of magnetically permeable material movable into said field.

2. A magnetic latch as in claim 1 in which said magnet unit includes a strike plate having a strike opening therein, said body of magnetic material is disposed adjacent said strike opening, and said pole pieces are disposed adjacent said body and said strike opening to establish said magnetic field in the vicinity of but asymmetrical with respect to said strike plate and said strike opening.

3. A magnetic latch as in claim 2 in which said magnet unit is on one side of said strike plate and a substantial portion of said asymmetrical magnetic field is on the other side of said strike plate.

4. A magnetic latch as in claim 1 in which said magnet unit includes a strike plate having a strike opening therein, and includes means for mounting said body of magnetic material behind said strike plate and spaced therefrom a distance to allow said latch members to extend through said strike opening, and said pole pieces extend from said body of magnetic material substantially to said strike plate.

5. A magnetic latch as in claim 4 in which said pole pieces are substantially L-shape with one leg of each pole piece disposed near each side of said strike opening.

6. A magnetic latch as in claim 1 in which said latch unit includes a housing, means forming a vertical pivot in said housing for said pivoted latch member, means constraining said sliding latch member to rectilinear motion, a pin and slot interconnection in said interconnecting means, and a lost-motion actuating means connected to said sliding latch member.

7. A magnetic latch as in claim 1 in which said latch unit includes a housing, a lost-motion actuating means connected to one of said latch members, and a spring interposed between said housing and said actuating means for urging said latch actuating means in one direction.

8. A magnetic latch as in claim 1 in which both of said latch members in one portion of their travel are movable into said other member solely by magnetic and centrifugal forces.

9. A magnetic latch as in claim 1 in which said latch unit includes a housing, a face plate having a latch opening therein, means for mounting said face plate on said housing, means for mounting said pivoted latch element for pivotal motion about a vertical axis adjacent one side of said latch opening, and means for mounting said sliding latch member for sliding motion adjacent the other side of said latch opening.

10. A magnetic latch as in claim 1 including a transverse abutment on said sliding latch member, a strut member adapted to move between a first position out of the path of said abutment and a second position in said path of said abutment, means for urging said strut member toward said second position, means connected to said latch member with a lost-motion interconnection for sliding said latch member, and means on said sliding means for camming said strut member toward said first position during said lost motion.

11. A magnetic latch as in claim 10 in which said sliding latch member and said strut are of magnetic material and said urging means includes magnetism induced in said strut.

12. A magnetic latch device for use with a latch member movable between an extended position and a retracted position, said device including a strike plate with a strike opening therein, a body of magnetic material disposed behind and remote from said strike opening to leave an intervening space adapted to receive the latch member in said extended position and laterally displaced to offset the field in the direction of approach of the latch member toward latching position, and a pair of pole pieces each having portions extending from said body of magnetic material along the sides of said space substantially to said strike plate.

13. A magnetic latch device as in claim 12 in which a strike box is secured to said strike plate and houses said body of magnetic material and said pair of pole pieces.

References Cited

UNITED STATES PATENTS

| | | | |
|---|---|---|---|
| 1,085,347 | 1/1914 | Leduc | 292—144 |
| 1,514,528 | 11/1924 | Hurd | 292—192 |
| 2,219,186 | 10/1940 | Hornfeck | 292—251.5 X |
| 2,888,289 | 5/1959 | Scott et al. | 292—201 |
| 2,954,253 | 9/1960 | Teetor | 292—251.5 |
| 3,107,934 | 10/1963 | Lee | 292—340 X |
| 3,129,968 | 4/1964 | Graham | 292—201 |
| 3,273,925 | 9/1966 | Graham | 292—201 |
| 2,053,805 | 9/1936 | Van Note | 292—192 X |

RICHARD E. MOORE, *Primary Examiner.*